May 17, 1949.    J. R. MacDONALD    2,470,177
LOBSTER TRAP
Filed Feb. 2, 1946

Inventor
Joseph R. MacDonald
by Roberts, Cushman, Grover
Att'ys.

Patented May 17, 1949

2,470,177

UNITED STATES PATENT OFFICE 2,470,177

LOBSTER TRAP

Joseph R. MacDonald, Winchester, Mass., assignor to Macmor Corporation, Boston, Mass., a corporation of Massachusetts Application February 2, 1946, Serial No. 645,125

2 Claims. (Cl. 43—100)

Figure 1:
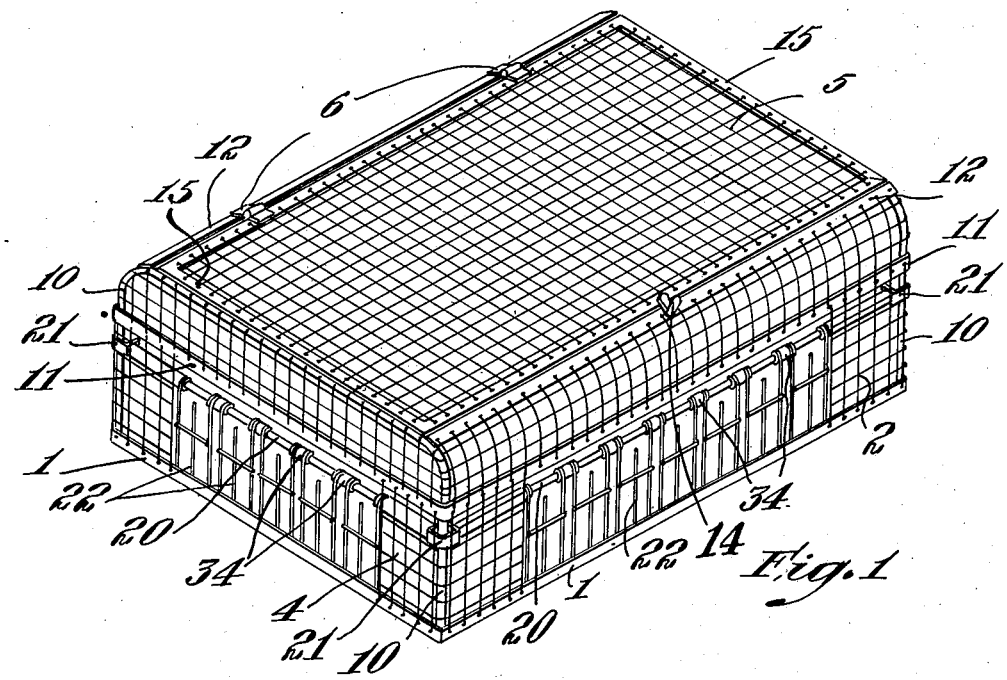
Figure 2:
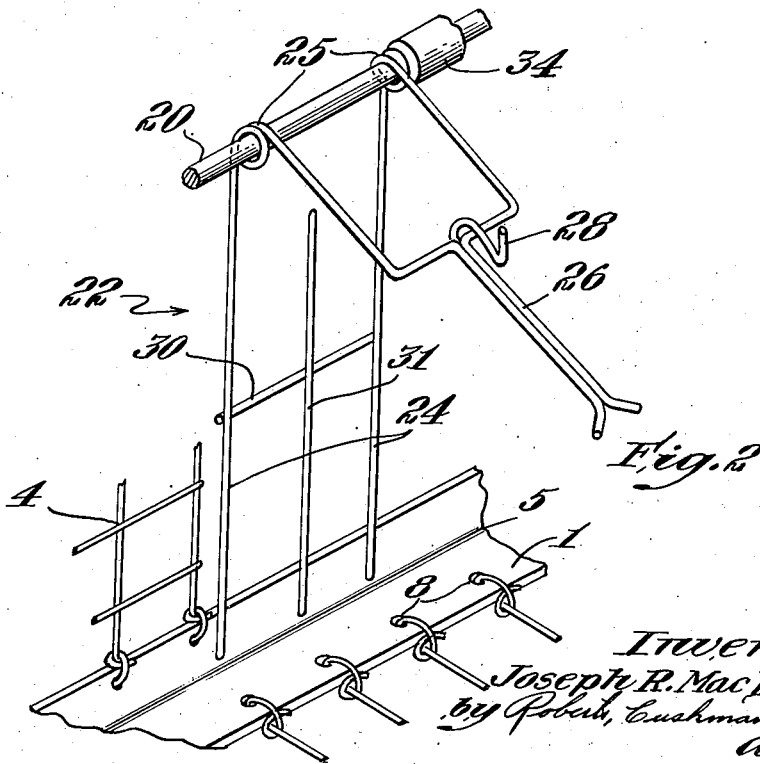

This invention relates to lobster traps and its principal objects are to provide a trap which is efficient and reliable in operation and which is of simple design, but of strong and durable construction, capable of withstanding severe usage, and to provide a trap having bait and/or lure members which are so disposed as to attract lobsters and the like crustaceans. Further objects relate to various features of construction and will be apparent from a consideration of the following description and accompanying drawings, wherein:

Fig. 1 is an isometric view of a lobster trap constructed in accordance with the present invention; and Fig. 2 is an isometric view showing one of the counter-balanced gates and adjacent end and bottom walls, as viewed from the inside of a trap.

The embodiment herein shown for the purpose of illustration comprises a box-like structure having a rectangular frame 1 of angle iron which provides a base for supporting the bottom wall and to which the lower ends of the side and end walls 2 and 4 are secured, the top of the trap being closed by a cover 5 which is pivotally secured to the upper end of the rear side wall by hinges 6. The cover and bottom, side and end walls are preferably formed of heavy wire screen of about 1 mesh, or the like foraminous material which may be galvanized, tinned or otherwise rendered corrosion-resistant. The ends of the wires constituting the bottom wall are welded or otherwise secured to the horizontal flange of the base 1, as indicated at 8 in in Fig. 2.

At each end wall is an inverted U-shaped heavy wire or light steel rod 10, the ends of which are welded or otherwise suitably secured to the angle iron 1 and slightly below the bend of the rods 10 is a metal strap 11 extending circumferentially about the four walls of the trap. The lower ends of the wires constituting the lower and side walls are secured to the vertical flange wing of the angle iron 1 and their upper ends are welded or otherwise secured to the strap 11. In a similar manner the lower ends of the wires constituting the upper part of the side and end walls are welded to the strap 11 and their upper ends are welded or otherwise secured to the central horizontally extending portion of the rod 10 or a strap 12 which defines the upper edge of the opposite side walls 2. The rear strap 12 carries one wing of the hinges 6 and the strap 12 at the upper edge of the front wall carries a latch member 14 by means of which the cover 5 may be held closed.

The cover 5 comprises a rectangular metal frame 15 which closely fits the opening defined by the straps 12 and upper ends of the rods 10, and the ends of the wires constituting the top wall or cover body are welded or otherwise secured to the frame 15, the construction and arrangement of parts being such that the latch 14 may be swung so that it overlies the adjacent edge of the frame 15 so as to lock the cover in closed position.

Each side and end wall is formed with an elongate opening disposed between the angle iron 1 and the circumferentially extending strap 11 and spaced inwardly from the corners defined by the vertical legs of the rod 10, and beneath the strap 11 are horizontal rods 20, one for each opening, the ends of which are connected to or supported by brackets 21 secured to the vertical legs of the rods 10. The rods 20 pivotally support a bank of gates or trap doors (Fig. 2), each of which comprises a pair of spaced vertical legs 24, extending upwardly from the angle iron 1 with their central portions looped about the rods 20, as indicated at 25, to provide pivotal connections. The ends of the wires 24 are bent inwardly and downwardly into convergent relation so as to provide, in effect, a combined counterweight and lure or bait support 26. A short length of wire 28, bent to form a hook, may be welded to the junction of the two wires 24 to provide means cooperating with the ends 26 for holding a bait bag or another lure. Vertically and horizontally extending wires 30 and 31 are welded together and the ends of the horizontal wire 30 are welded to the legs 24 so as to reduce the size of the openings between the legs without materially obstructing visibility of the lures and a central bait spit that may be provided.

In the construction and arrangement of parts herein shown, the lower ends of the legs 24 and pickets 31 are engageable with the upstanding wing of the angle iron 1 which constitutes an abutment or stop preventing outward swinging movement of the gates, and the counter-balance provided by the ends 26 normally hold the gates closed even when the trap is in an inclined position, but permits each gate to swing inwardly in response to pressure exerted on the legs 24 and/or members 30, 31 by a lobster, crab or the like crustacean. In order to insure unhampered action and maintain each gate in properly spaced relation, spacing collars or sleeves 34, carried by the rods 20, are disposed between the loops of adjacent gates.

Ordinarily the weight of the trap may be relied upon to provide sufficient anchorage when in use, although if desired, additional weights in the form of flat stones or other type of anchorage may be used in conventional manner, and any suitable means may be provided for attaching the trap to the end of the usual buoy line.

It will be observed that any one or group of the gates 22 may be easily swung inwardly by a lobster approaching the lure bait on the holder 26, or the central spit, and that when inside the trap there is not way for the lobster to escape since gnawing at the lure bait merely tends to hold the associated gate more firmly closed. Comparative tests with conventional lobster traps indicate that a trap constructed in accordance with the present invention will generally produce a several-fold increase in the "catch" due to the increased luring-power and accessibility, and also the practical impossibility of escape after entering into the trap.

While I have shown and described one desirable embodiment of the invention it is to be understood that this disclosure is for the purpose of illustration and that various changes and modifications may be made without departing from the spirit and scope of the invention as set forth in the appended claims.

I claim:

1. In a trap of the type having a box-like structure provided with at least one side wall having an elongate, horizontally extending opening, a trapdoor comprising a horizontally extending rod running lengthwise along the upper end of said opening, a plurality of counter-balanced gates pivotally supported by said rod to swing inwardly so as normally to close said opening, each gate comprising spaced wires extending vertically from the bottom of said opening with their central portions looped about said rod so as to provide a pivotal connection therewith permitting the gate to swing inwardly, the upper ends of said wires being bent inwardly into converging relation so as to provide a counterweight normally holding the gate closed, a lure-holder secured to said counterweight, and an upstanding abutment at the lower part of said opening engageable with the lower end of said gates to prevent outward swinging movement thereof.

2. In a trap of the type having a box-like structure provided with at least one side wall having an elongate, horizontally extending opening, a trapdoor comprising a horizontally extending rod running across the upper end of said opening, a counter-balanced gate pivotally supported by said rod to swing inwardly so as normally to close said opening, said gate comprising a pair of spaced wires extending vertically from the bottom of said opening with their central portions looped about said rod so as to provide a pivotal connection therewith permitting the gate to swing inwardly, the upper ends of said wires being bent inwardly into converging relation so as to provide a counterweight operative normally to hold the gate closed, a lure-holder secured to said counterweight, and an upstanding abutment at the lower part of said opening engageable with the lower end of said wires to prevent outward swinging movement of the gate.

JOSEPH R. MacDONALD.

REFERENCES CITED

The following references are of record in the file of this patent:

UNITED STATES PATENTS

| Number | Name | Date |
| --- | --- | --- |
| 366,802 | White | July 19, 1887 |
| 729,786 | McDaniel | June 2, 1903 |
| 1,262,160 | Barker | Apr. 9, 1918 |
| 1,335,359 | Beisel | Mar. 30, 1920 |
| 1,619,366 | Peterson | Mar. 1, 1927 |
| 1,765,941 | Sawyer | June 24, 1930 |

FOREIGN PATENTS

| Number | Country | Date |
| --- | --- | --- |
| 278,962 | Great Britain | Oct. 20, 1927 |